United States Patent [19]

De Rugeris

[11] 3,728,564
[45] Apr. 17, 1973

[54] ELECTROMECHANICAL ENERGY CONVERSION DEVICE

[76] Inventor: John De Rugeris, 695 Kenneth Avenue, Campbell, Calif. 95008

[22] Filed: Feb. 3, 1971

[21] Appl. No.: 153,462

[52] U.S. Cl. ............. 310/168, 310/114, 310/172, 310/198
[51] Int. Cl. ............................................ H02k 17/42
[58] Field of Search .................. 310/68, 166, 168, 310/169, 170, 114, 171, 172, 112, 182, 183, 184, 179, 180, 188, 197, 198, 201, 203, 207

[56] References Cited

UNITED STATES PATENTS

| 3,535,572 | 10/1970 | De Rugeris | 310/114 |
| 3,599,023 | 8/1971 | Bottrell | 310/207 |
| 3,046,471 | 7/1967 | Williams | 310/112 |
| 3,335,307 | 8/1967 | Levy | 310/185 |
| 3,167,700 | 1/1965 | Neyhouse | 310/166 |
| 3,237,036 | 2/1966 | Konig | 310/198 |
| 3,179,828 | 4/1965 | Apking | 310/197 |

*Primary Examiner*—R. Skudy
*Attorney*—Thomas E. Schatzel and Claude A. S. Hamrick

[57] ABSTRACT

An electromechanical energy conversion device including a magnetic field source and armature structure movable relative to one another, said device being adapted to convert mechanical energy to electrical energy as the field and armature travel relative to one another along a given path and to simultaneously convert electrical energy to mechanical energy to facilitate said travel.

17 Claims, 11 Drawing Figures

PATENTED APR 17 1973 3,728,564

INVENTOR.
JOHN De RUGERIS
BY Thomas C. Schatzel
ATTORNEY

INVENTOR.
JOHN DeRUGERIS

BY Thomas Schatzel

ATTORNEY

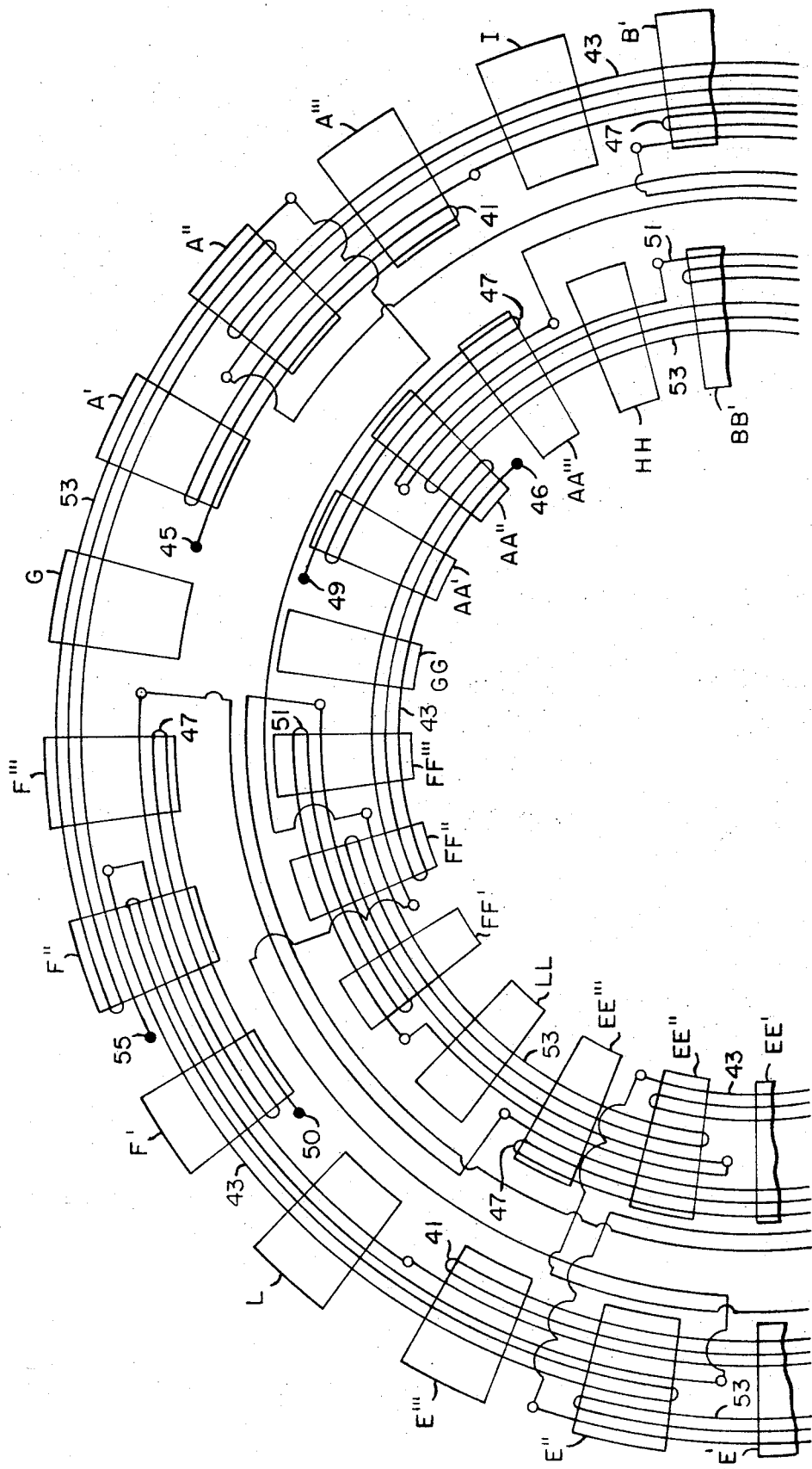

ELECTROMECHANICAL ENERGY CONVERSION DEVICE

BACKGROUND OF THE INVENTION

The present invention relates to electromechanical energy conversion devices for converting electrical energy to mechanical energy and mechanical energy to electrical energy.

Electromechanical energy conversion devices take various forms including rotating machinery, relays, switches, transformers, etc. The present invention, in one application, provides for improved devices for generating alternating current voltage. In most electricity generating devices electric currents are produced in coils of electrically conductive material by the relative motion of a set of such coils known as the "armature" and a "magnetic field." The magnetic field may be produced by an electromagnet or permanent magnetic such that the magnetic force lines of the latter intersect or are intersected by the turns of the armature coils. To increase the electrically-generating effect of the magnetic field upon the turns of the armature coils, such coils are usually provided with cores of iron or other material of lesser magnetic reluctance than air to concentrate the magnetic field into the immediate vicinity of the coils to cause a greater number of force lines to be intersected by the turns of the armature coils during relative rotation of the armature and field structures. The relative movement of said devices is maintained by incorporation of a prime mover to drive either the armature or the field. It is a common criteria of such devices to achieve high efficiency. Such efficiency may be referred to as the ratio of the output power to the required input power.

The prior art includes various electricity generating machines and alternators available for converting mechanical energy to electrical energy. For example, such an alternator is disclosed in U.S. Pat. No. 3,535,572 issued to the present inventor on Oct. 20, 1970.

An object of the present invention is to provide an improved electromechanical energy conversion device adapted to provide a highly favorable efficiency. Further objectives include provision of devices economical to manufacture and of compact size.

SUMMARY OF THE PRESENT INVENTION

The present invention provides an improved electromechanical energy conversion device and more particularly a highly efficient device which may be compactly structured and economically manufactured.

The present invention is adapted to simultaneously incorporate the converting of mechanical energy to electrical energy and electrical energy to mechanical energy. The devices simultaneously generate an electrical energy across windings under the influence of the field while creating a magnetic field at advanced positions of the armature to urge the rotor along its path of travel. The device includes an armature structure and a field assembly movable relative to one another. The field assembly is arranged along an axial plane with poles of one denomination concentrated adjacent to one another and axially offset relative to poles of the other denomination which are also concentrated adjacent to one another. The armature structure incorporates a pair of assemblies, with each assembly being positioned adjacent to the relative path of travel of the field poles of a common denomination. Each of the armature assemblies include a plurality of equi-spaced armature poles positioned adjacent to the relative path of travel. Each of said armature poles of each assembly are magnetically joined in common to an armature pole of the opposite armature assembly. The armature assemblies each include a plurality of main winding coils. Each main winding coil encompasses a plurality of poles to form a primary armature pole such that a plurality of equi-spaced primary armature poles are established adjacent to the relative path of travel. The main winding coils of alternate primary armature poles are electrically engaged in common such that adjacent primary armature poles are of different main winding circuits. At least one of the main winding circuits about one armature assembly is electrically common to a main winding circuit of the other armature assembly. The electrically common main windings at one armature assembly are radially advanced relative to the alignment of the field and common main windings at the other armature assembly. Encompassing windings, encompassing poles of adjacent primary armature poles are included and adapted to supplement or counter the magnetic flux intensity at associated armature poles. Accordingly, electrical pulses are induced in the main windings as the flux from the field passes the main winding with alternate pulses induced in the windings being of opposite relative polarity. Simultaneously, poles preceding the rotor along the path of travel establish a magnetic attraction to the rotor and poles succeeding the rotor along the path of travel establish a magnetic repulsion to the rotor.

In an exemplary embodiment of the present invention, the device is in the form of an alternator. The alternator comprises sets of series-connected coils which form individual generating circuits. The armature and field structures are rotatable relative to one another about a common axis of rotation establishing a common orbit of relative rotation. At least one of the generating circuits include windings spaced from each other in the direction of the axis of rotation of the rotor. The field structure, which may comprise permanent magnets or electromagnets, establishes a sequence of magnetic north primary poles and a sequence of magnetic south primary poles. The poles of opposite denomination are spaced from each other along the axis of rotation, i.e. the pole pieces at one end of the magnetic structure are all north poles and the pole pieces on the other end of said structure are all south poles. The pole pieces of the same denomination are equi-spaced relative to each other along the orbit of relative rotation. The north poles are angularly displaced relative to the south poles along the orbit of relative rotation. The armature structure further includes a plurality of magnetic circuits each comprising a plurality of individual magnetic paths extending intermediate the orbits of relative rotation of the north and south primary poles with opposite ends displaced relative to each other along the orbit of relative rotation. Accordingly, the windings on each side of the armature may be influenced by pole pieces of each denomination. Each generating circuit may include a plurality of main coil windings or/and encompassing coil windings. The main coil windings are positioned to intersect the force lines of the adjacent field. The encompassing coil windings are connected to encompass parts of adjacent armature poles and to establish a field which momentarily aids a main winding coil of a first circuit and momentarily opposes a main winding coil of another circuit. The main windings are arranged such that adjacent main coil windings are of different circuits. The arrangement of the armature structure and field structure are such that each main coil winding momentarily generates a magnetic force first attracting the field towards the pole and then as the field passes the pole momentarily generating a magnetic force repelling the field to provide a push-pull effect on the rotor. Simultaneously, within each coil winding there is generated alternating signals which may be delivered to an electrical load. The encompassing windings generate alternating signals momentarily simultaneously aiding the field of one main winding while collapsing the field of an adjacent main winding. The encompassing windings reverse in operation to collapse the field of the first main winding and aid the other as the rotor advances. The encompassing windings may also be tied to an electrical load. The north and south poles of the field structure are angularly displaced relative to the generating circuits such that whenever a field pole of one denomination passes one of the main winding portions of an armature pole, the immediate preceding pole of the other denomination is at least under the influence of a main winding of another circuit. In this manner the generating circuits each provide alternating voltages which may or may not be in phase. Simultaneously, the armature poles associated with the windings establish a changing magnetic denomination to provide an alternately push-pull action on the rotor to facilitate rotation of the rotor.

BRIEF DESCRIPTION OF THE DRAWINGS

FIG. 4A and 4B is a diagrammatic end perspective view of the embodiment of FIG. 3 to illustrate the winding of the coils about the armature assemblies.

DESCRIPTION OF PREFERRED EMBODIMENTS

Figure 1:
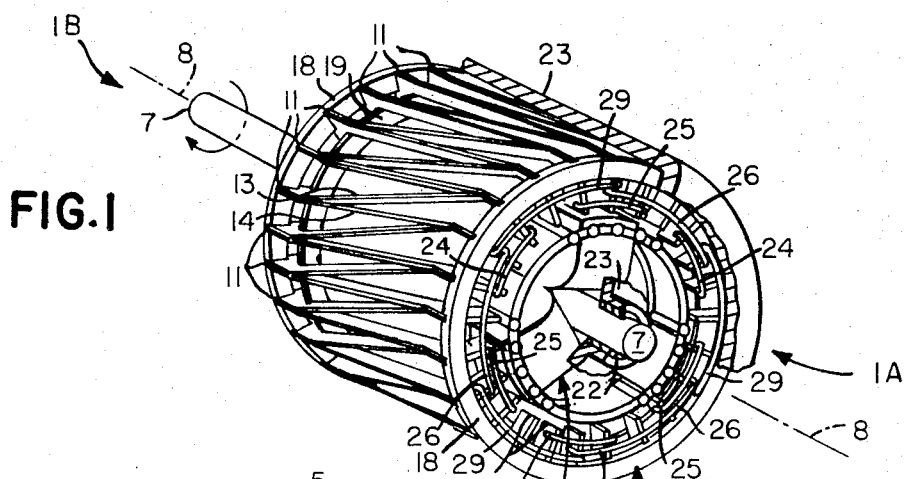
FIG. 1 is a perspective, partially sectioned view of an alternator incorporating the teachings of the present invention.
Figure 1A:
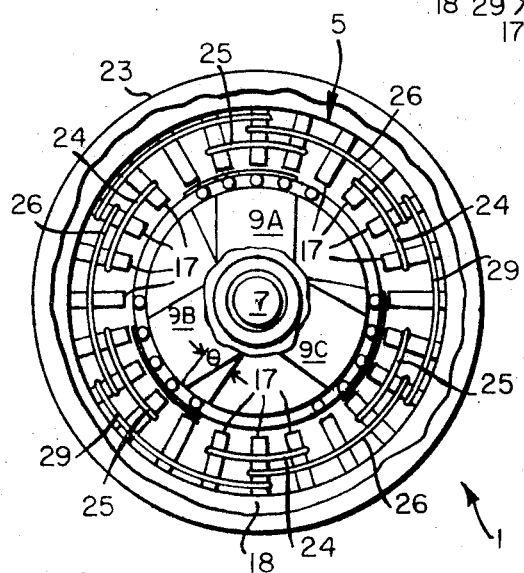
FIG. 1A is an end view about one end of FIG. 1.
Figure 1B:
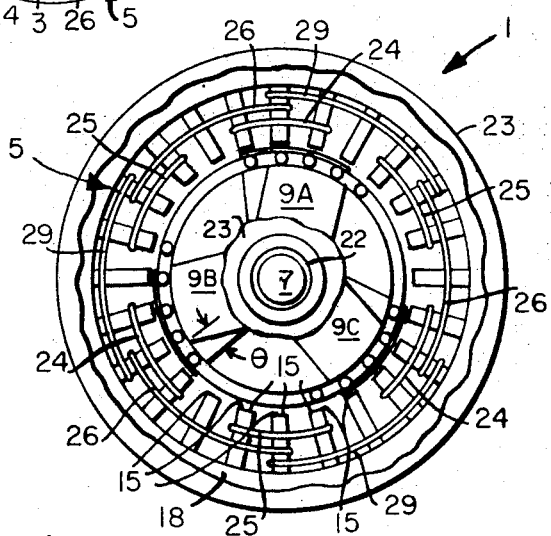
FIG. 1B is an end view about the other end of FIG. 1.
Figure 1C:
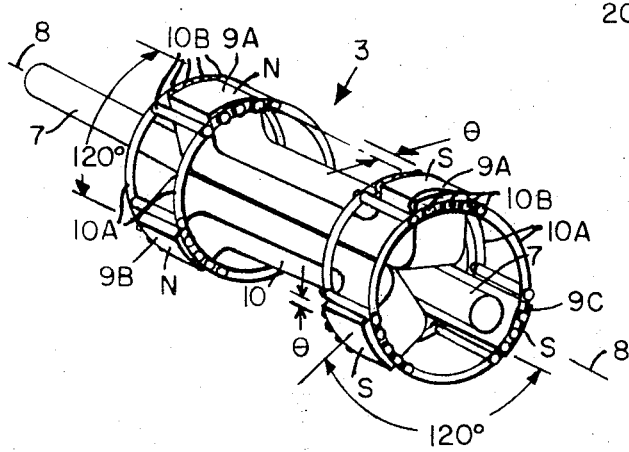
FIG. 1C is a perspective view of the rotor of the alternator of FIG. 1.
Figure 1D:
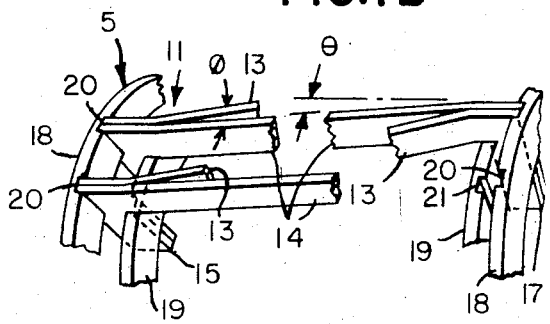
FIG. 1D is a perspective view of a section of the armature of the alternator of FIG. 1.
Figure 2:
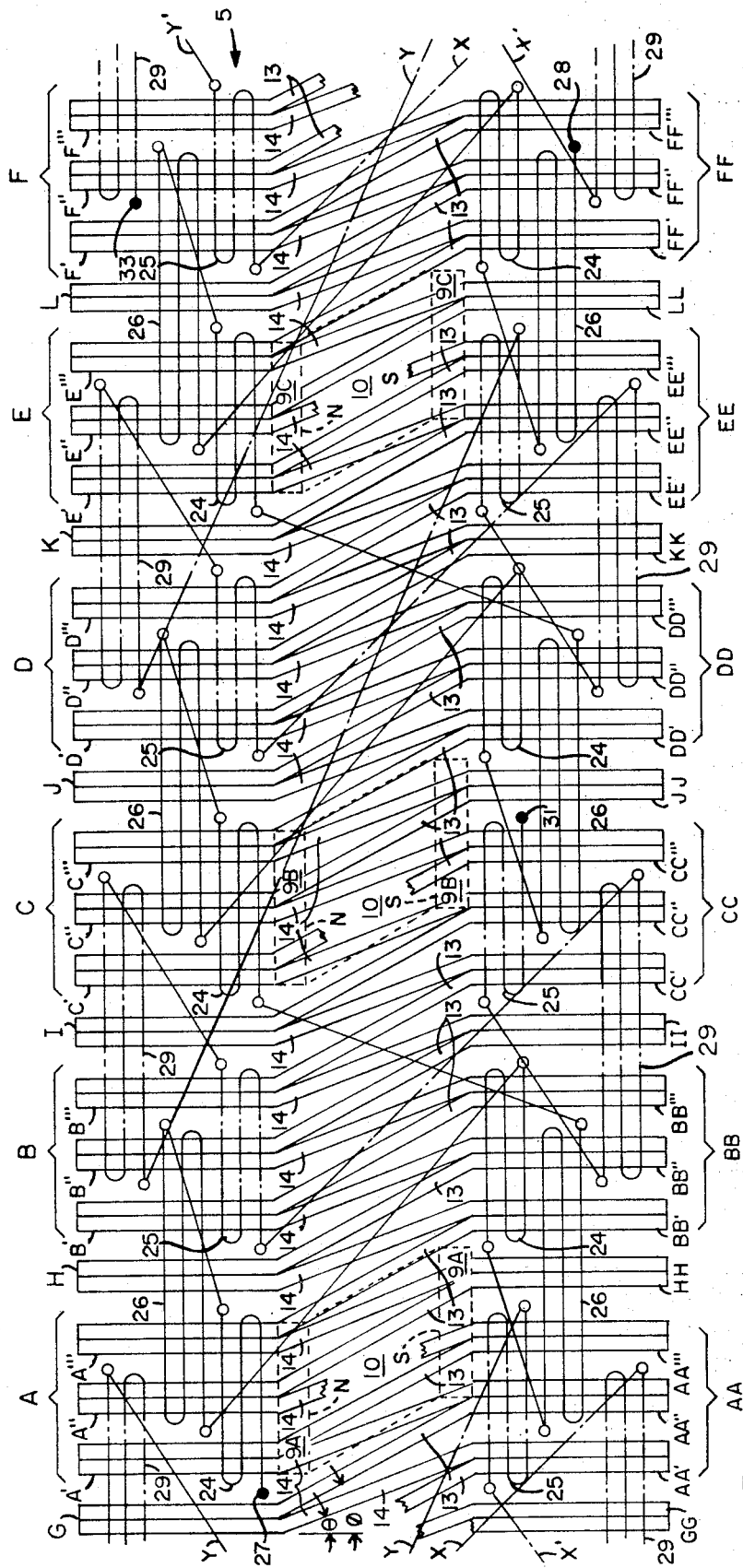
FIG. 2 is a diagrammatic illustration of the embodiment of FIG. 1 with the windings interconnected to provide two output signals.
Figure 2A:
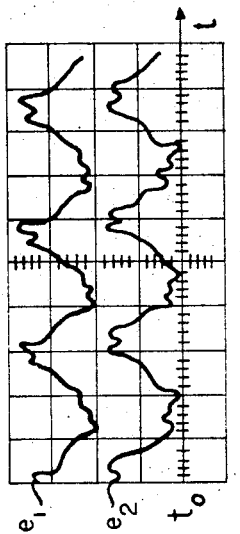
FIG. 2A is a pair of signal waveforms illustrating the signals generated by the circuits of the structure of FIG. 1.

FIG. 1 – FIG. 2A depict and illustrate an electromechanical energy conversion device in the form of an alternator, referred to by the general reference character 1 incorporating the teachings of the present invention. The alternator 1 is adapted to generate an alternating current voltage. The alternator 1 incorporates a field structure in the form of a rotor referred to by the general reference character 3 and an armature structure in the form of an annular stator structure referred to by the general reference character 5. The rotor 3 has a central shaft 7 rotatable about a common axis of rotation 8 and supporting a plurality of individual primary field poles in the form of U-shaped permanent magnets 9A, 9B and 9C. The permanent magnets designated 9A, 9B and 9C each carry a primary north field pole N and a primary south field pole S. The permanent magnets 9A, 9B and 9C are positioned such that all north field poles are assembled adjacent to one another, in an assembly with the poles equally spaced radially about the shaft 7. The south field poles S are assembled adjacent one another in an assembly with the poles equally spaced radially about the shaft 7. In the rotor 3, the poles are spaced 120° a part. The south field pole of each permanent magnet 9 is radially displaced relative to the preceding north field pole about the common orbit of rotation by an angle $\theta$, the value of which is hereinafter discussed. Each of the U-shaped magnets 9A, 9B and 9C includes a cross bar 10 integral with the north and south poles of each magnet. Each cross bar 10 extends parallel to the axis of rotation 8 with a radial advancement of the angle $\theta$. The faces of all of the north and south field poles are preferably of the same dimensions. The field assembly 3 includes a plurality of shorting rings 10A. The rings 10A about each field assembly are interconnected by magnetic conductive bars 10B to establish a plurality of magnetic circuits about each field pole of each field assembly.

The annular armature structure 5 is arranged with an armature assembly about the orbital path of the north primary field poles of the rotor 3 and an armature assembly about the orbital path of the south primary field poles of the rotor 3. The armature structure 5 includes a plurality of magnetic flux return paths 11 interconnecting the armature assemblies and spanning the individual orbital paths of rotation of the north and south primary field poles. The magnetic flux return paths 11 are in the form of a plurality of stacks of individual laminations 13 and 14 of magnetic material. The laminations 13 and 14 are urged together in stacks. The laminations 13 and 14 are each of U-shape spanning across the rotor field structure 3 intermediate the orbital paths of the north and south poles. The laminations 13 and 14 each have a face 15 and 17 at opposite ends with the faces 15 adjacent the orbital path of the north primary field poles and the faces 17 adjacent to the orbital path of the south primary field poles of the rotor 3. The faces 15 and 17 of the laminations 13 are interconnected with the pole face 17 advanced relative to the pole face 15 about the common orbit of rotation by an angle $\phi$. The pole faces 15 and 17 of the laminations 14 are interconnected with the pole face 17 advanced relative to the immediate preceding pole face 15 by approximately the angle $\theta$. The laminations 13 and 14 are assembled in units such that the faces 15 establish a plurality of individual armature poles adjacent to the orbital path of the north primary field poles and the faces 17 establish a plurality of individual armature poles adjacent to the orbital path of the south primary field poles. Each stack of laminations common to one of the armature poles assembled about the north primary poles is in part common to one of the armature poles assembled about the south primary field pole advanced by the angle $\theta$ and in part common to one of the armature poles assembled about the south primary field pole advanced by the angle $\phi$. Thus, each armature pole about the north primary field pole assembly is in part magnetically common to two advanced south armature poles. The various laminations are supported in position about each end by a pair of slotted rings 18 and 19 coaxial with the axis of rotation 8. The rings 18 and 19 are preferably comprised of nonmagnetic material. Each of the rings 18 and 19 respectively carry a plurality of slots 20 and 21 to receive the laminations 13 and 14. The faces of the laminations extend beyond the inner periphery of the rings to terminate adjacent to the orbital path of rotation of the north and south primary field poles. The extensions of the laminations are adapted to receive various armature winding coils, as hereinafter discussed. Intermediate each armature pole is an insulative medium which may be in the form of air or other desired insulative material. The shaft 7 of the rotor structure 3 is fitted to a pair of bearings 22 supported by a frame 23 encompassing the armature structure 5. The frame 23 and bearings 22 provide physical support and guidance of the rotor 3 and armature 5 to permit relative rotation.

FIG. 2 diagrammatically illustrates the device 1 assuming the apparatus is extended over a horizontal plane. The laminations 13 and 14 of the armature structure 5 are such that a first armature assembly includes six primary armature poles A, B, C, D, E and F assembled about the orbital path of the north primary field poles and a second armature assembly includes six primary armature poles AA, BB, CC, DD, EE and FF assembled about the path of the south primary field poles. Each primary armature pole comprises three cores with an insulative medium intermediate adjacent cores. The cores are arranged for reception of winding coils such that the intermediate core of each primary armature pole may be viewed as a shade pole. The field pole pieces 9A, 9B and 9C are represented by bars of sufficient angular width to span a primary armature pole, i.e. three consecutive armature core structures. As illustrated the primary armature pole A of the first armature assembly comprises three annular core structures A', A'', A'''; the primary armature pole B comprises three annular core structures B', B'', and B'''; etc. The primary armature pole AA of the second armature assembly comprises three annular core structures AA', AA'' and AA'''; the primary armature pole BB comprises three annular armature core structures BB', BB'', and BB'''; etc. Intermediate each primary armature pole is an isolative pole. The first armature assembly includes a plurality of isolative poles G, H, I, J, K and L respectively positioned intermediate poles F and A, A and B, B and C, C and D, D and E, and E and F. The second armature assembly includes a plurality of isolative poles GG, HH, II, JJ, KK and LL respectfully positioned intermediate poles FF and AA, AA and BB, BB and CC, CC and DD, DD and EE, EE and FF. The primary armature poles A, B, C, D, E and F are respectfully in axial alignment with the poles AA, BB, CC, DD, EE and FF. The isolative poles G, H, I, J, K and L are respectfully in axial alignment with the isolative poles GG, HH, II, JJ, KK and LL. All core structures and isolative poles are of uniform width and spacing with the width of the core structures corresponding to the width of the intermediate spacings. The core structures and isolative poles are insulated from one another by means of insulative material within the spacing intermediate each core structure and isolative pole. A relative orbit of rotation is established about the first armature assembly about the outer periphery of the north poles of the magnets 9A, 9B and 9C and the terminus of the armature cores and isolative poles. A relative orbit of rotation is also established about the second armature assembly about the outer periphery of the south poles of the magnets 9A, 9B and 9C. The laminations comprising the core structures about the first armature assembly are correspondingly part of a pair of core structures or a core structure and isolative pole about the second armature assembly to establish magnetic paths intermediate the armature assemblies. Magnetic circuits are established between the two armature assemblies with common circuits established between armature poles of one armature assembly and two radially advanced cores or a core and isolative pole about the other armature assembly. For example one-half of the laminations comprising the isolative pole G are common with one-half of the core AA' which is advanced by the angle $\theta$ about the common orbit of rotation. The other half of the laminations of the isolative pole G are common with one-half of the core AA'' advanced by the angle $\phi$ about the common orbit of rotation. The laminations 14 of core A' are common with the south core AA'' and the laminations 13 of the core AA'' are common with the south core A'''. The laminations 14 of the core A'' are common with the other half of the core AA''' and the laminations 13 of the core A'' are common with one-half of the isolative pole HH. The laminations 14 of the core A''' are common with the other half of the isolative pole HH and the laminations 13 of the core A''' are common to one-half of the core BB'. The laminations 14 of the isolative pole H are common to the other one-half of the core BB' and the laminations 13 of the isolative pole H are common to one-half of the core BB''.

Alternators of the present invention usually comprise a plurality of separate generating circuits. Each generating circuit comprises a plurality of coils connected in a series. About each primary armature pole A, C and E and each primary armature pole BB, DD and FF of the device 1 is a portion of a main winding coil 24 to establish an electromagnetic action at each of said armature primary poles and associated cores. About each primary armature pole B, D and F and each secondary armature pole AA, CC and EE is a portion of a main winding coil 25 to establish an electromagnetic action at each of said primary armature poles and associated cores. The main winding coils 24 and 25 are arranged alternately adjacent to each other along the orbits of relative rotation with an isolative pole intermediate adjacent coils 24 and 25. The armature structure 5 further carries a first encompassing coil 26 split into six portions with a first portion encompassing the cores A'', A''', B', B'' and isolative pole H; a second portion encompassing the cores AA'', A''', BB', BB'' and isolative pole HH; a third portion encompassing the cores C'', C''', D', D'' and isolative pole J; a fourth portion encompassing the cores CC'', CC''', DD', DD'' and isolative pole JJ; a fifth portion encompassing the cores E'', E''', F', F'' and isolative pole L; and a sixth portion encompassing the cores EE'', EE''', FF', FF'' and isolative pole LL. Thus, each portion of the encompassing winding 26 encompasses part of adjacent primary armature poles of different generating circuits. The main coil winding 24 and the encompassing coil 26 are tied in series with a pair of terminals 27 and 28 to establish a common generating circuit. An electrical load may be joined across the terminals 27 and 28.

The armature structure 5 further carries a second encompassing coil 29 split into six portions with a first portion encompassing the cores B'', B''', C', C'' and isolative pole I; a second portion encompassing the cores BB'', BB''', C', CC'' and isolative pole II; a third portion encompassing the cores D'', D''', E', E'' and isolative pole K; a fourth portion encompassing the cores DD'', DD''', EE', EE'' and isolative pole KK; and a sixth portion encompassing the cores FF'', FF'''AA'$\Phi \cdot ^{AA''}$, and isolative pole GG. Thus, each portion of the coil 29 encompasses part of adjacent primary armature poles of different generating circuits. The main coil 25 and the encompassing coil 29 are tied in series with a pair of terminals 31 and 33 to establish a common generating circuit. An electrical load may be tied across the terminals 31 and 33.

Accordingly, each core of each primary armature pole is encompassed by a main coil winding and at least one encompassing winding. The main windings are arranged to include alternate primary armature poles on opposite sides or assemblies of the armature. The included primary armature poles on one side are radially offset relative to the included poles on the opposite side. The shade pole of each primary armature pole is encompassed by a coil of one of the main windings 24 or 25 and a coil of the encompassing winding 26 and the encompassing winding 29.

The theory of operation of the alternator 1 is believed to be as hereinafter set forth. The field structure 3 serves as a continuous magnetic flux generating source. With the field structure rotor 3 in rotation the magnetic force lines eminate from the primary north field poles and intersect the armature primary poles and return through the common magnetic circuits established by the laminations 13 and 14 to the primary south field poles. As the flux from the field structure 5 cuts across the coil sides a voltage is induced in that coil. Voltage is induced as the flux cuts across the coils when approaching the coil and when leaving the coil with the voltages being of opposite relative polarity. Simultaneously, a voltage is induced in the windings joined in electrical series such that the associated armature cores tend to become polarized to a degree dependant on the induced voltage. The stack of laminations 13 and 14 establishing the individual cores substantially concentrate the magnetic flux lines within the established magnetic paths. The various common magnetic paths formed by the laminations 13 and 14 extend intermediate the two armature assemblies and are radially advanced about the orbital paths with part advanced the angle $\theta$ and part advanced the angle $\phi$. Accordingly, as the field structure rotates relative to the armature structure, the individual cores of each primary armature pole are part of the time primarily under the influence of either a north or a south field pole and part of the time simultaneously under the influence of poles of both denominations. The dominant influence on each primary armature pole is dependent upon the relative position of the field and the number of cores of an armature pole under the influence of a field pole. As shown in FIG. 2 the angle $\theta$ corresponds both to the angle of advance about the orbital path of the south poles relative to the preceding north pole of each permanent magnet 9 of the field structure 5 and to the angle between the leading edge of a core on one armature assembly and the center of the first radially advanced core on the other armature assembly. When the north field poles 9A, 9B and 9C are in full alignment with the corresponding primary armature poles A, C and E, the associated south field poles 9A, 9B and 9C are relatively radially advanced and common to the advanced one-half of the axial opposite secondary poles AA, CC and EE, and the advanced isolative poles HH, JJ and LL. Thus, in this instantaneous position, the field magnets 9A provides for a flux path between the cores A' and cores AA'' and AA'''; between the core A'' and the core AA''' and the isolative pole HH; and between the core A''' and the isolative pole HH. In this position the main windings 24 are predominately under the influence of the north field pole and the main windings 25 under the influence of the south field pole. Viewing FIG. 2 a similar relationship simultaneously exists with the magnets 9B and 9C. Accordingly, at the position illustrated the primary armature poles B, D and F, due to the induced voltage in the main winding coil 25 are predominately magnetic south oriented thereby offering an attraction to the north polarized field poles 9A, 9B and 9C. Simultaneously, the primary armature poles A, C and E are predominately magnetic north oriented thereby offering a repulsion to the field structure. Also, the primary armature poles AA, CC and EE are magnetic south oriented thus tending to repel the field structure and the primary armature poles BB, DD and FF are north oriented thus, offering an attraction to the south poles of the field structure. As the field structure rotates, the field poles align with different primary armature poles and cores and the flux lines cut across other of the main windings at differing degrees. As the field rotates from the instantaneous position of FIG. 2A, the main winding coil 24 comes under the influence of the south field poles due to the position relationship of the south field poles 9A, 9B and 9C with the cores of the armature poles BB, DD and FF. Simultaneously, the main windings 25 become increasingly influenced by the north primary field poles due to the position relationship of the north field poles 9A, 9B and 9C with the armature poles B, D and F. The degree of influence of the primary field poles to the individual generating circuits continuously change dependent upon the number of cores of an individual primary armature pole influenced by a field pole and the relative position of the adjacent field pole. Thus, relative rotation of the described field and armature structures produces in rapid succession pulses of alternate polarity in each of the generating circuits. The coils of each generating circuit are never idle and every coil is continuously under the influence of the flux of a north primary field pole, a south primary field pole or both with the degree of influence dependant upon the instantaneous relative position. The electrical circuits about the first armature assembly are balanced relative to the electrical circuits about the other armature assembly. Also, the circuits are magnetically balanced such that each side of the field is alternately under induction-repulsion action with the actions continuously aiding each other to continuously aid in advancing the rotor.

Analyzing the instantaneous position of the field structure 3 and armature structure 5 as depicted in FIG. 2 and referring to such time as $t_o$, a positive voltage is induced in the main coil winding 24. Simultaneously, a positive voltage is induced in the main coil windings 25. Also, a positive voltage is induced in the encompassing windings 26 and 29 which in turn produces a positive flux in the magnetic circuits of the armature primary poles B, D and F thereby tending to collapse the magnetic flux induced by the voltage through the main coil winding 25. Simultaneously, a voltage is induced in the encompassing windings 29 which tends to aid the armature poles B, D and F. Thus at the instant $t_o$ the primary armature poles A, C and E are tending to push or repel the rotor assembly 3 while the armature poles B, D and F have established a south magnetic polarity thereby tending to attract or pull the armature forward. At the same time, the armature poles BB, DD and FF have established a north polarity due to the interconnection of the main coil windings 24 thereby tending to attract or pull the south field poles 9A, 9B and 9C. As the rotor rotates and the south field poles 9A, 9B and 9C tend to align with the primary armature poles BB, DD and FF a negative voltage is induced in the coil windings 24 while the coil windings 25 tend to also go negative due to the influence of the south field poles. Thus, the armature poles A, C and E now appear more analogous to a south polarized pole while the armature poles B, D and F appear more as north polarized poles. At the same time armature poles AA, CC and EE react more as north polarized poles and the armature poles BB, DD and FF appear more as south polarized poles. As the south field poles of the rotor approaches alignment with the armature primary poles BB, DD and FF, the dominant polarization of the poles BB, DD and FF becomes south oriented tending to repel the rotor thereby pushing it forward while the armature primary poles B, D and F are still south polarity dominated tending to pull the rotor forward. This push-pull relationship exists until the north field poles are in full alignment with the armature poles B, D and F at which time the poles A, C and E become south polarity dominated thereby attracting the rotor towards them while the now north polarity of the poles B, D and F tends to push the rotor forward. This relationship tends to continue thereby giving a balanced action and reaction on the rotor. At the same time the encompassing windings 26 and 29 are arranged such that as the leading edge of the field poles approach an associated armature primary pole, the signal tends to collapse or oppose the field of the main coil winding and continues to do so until the leading edge approaches the center core of the pole at which time the encompassing winding switches functionally and aides the main winding thereby increasing the pushing force. As illustrated in FIGS. 2A the signal $e_1$ across the terminals 27 and 28 assumes an alternating waveform. Simultaneously, a substantially in phase signal $e_2$ is generated across the terminals 31 and 33.

Figure 3:
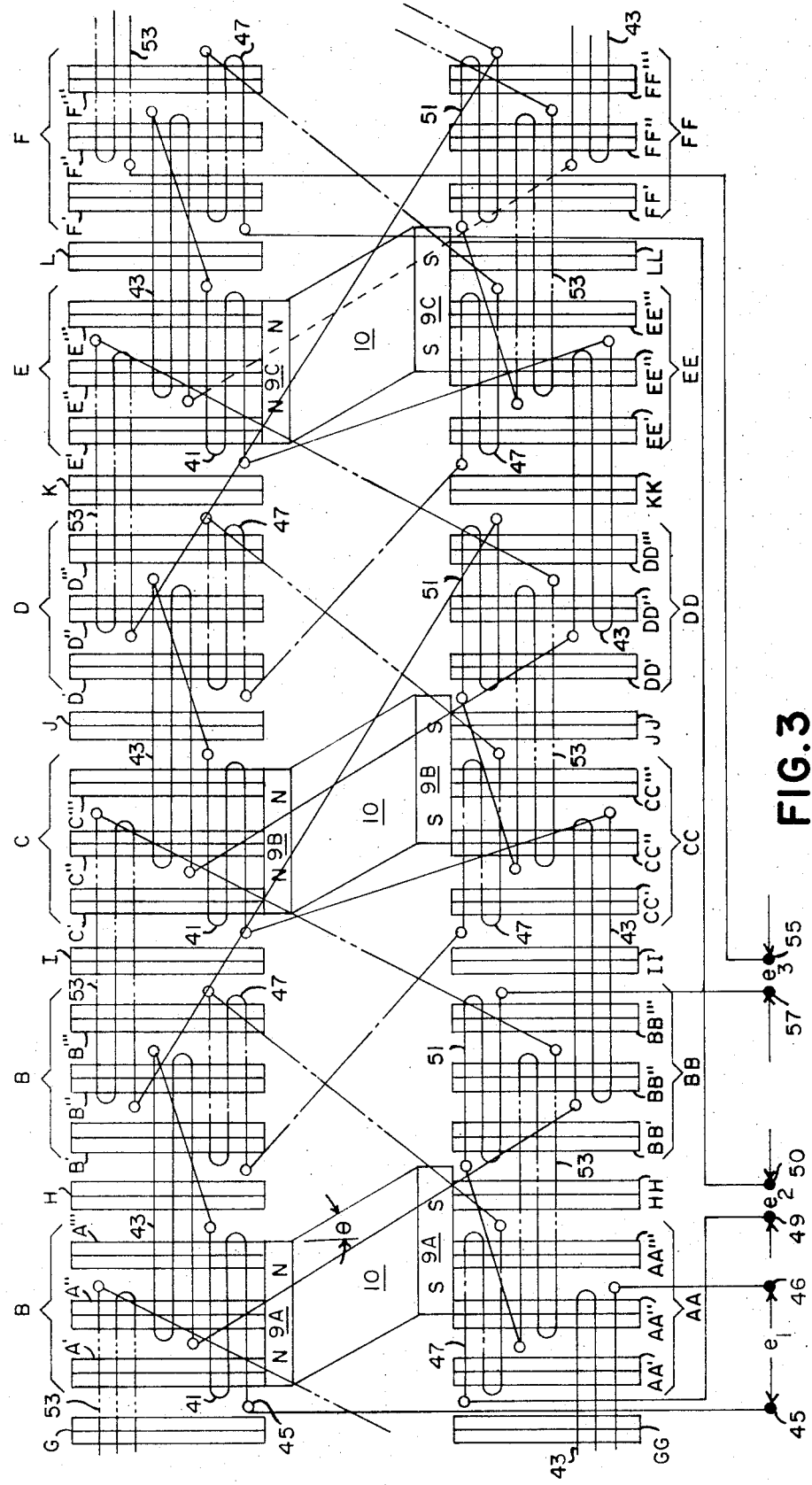
FIG. 3 is a diagrammatic illustration of the embodiment of FIG. 1 with the windings joined in an alternative relationship to provide three output signals.
Figure 4B:
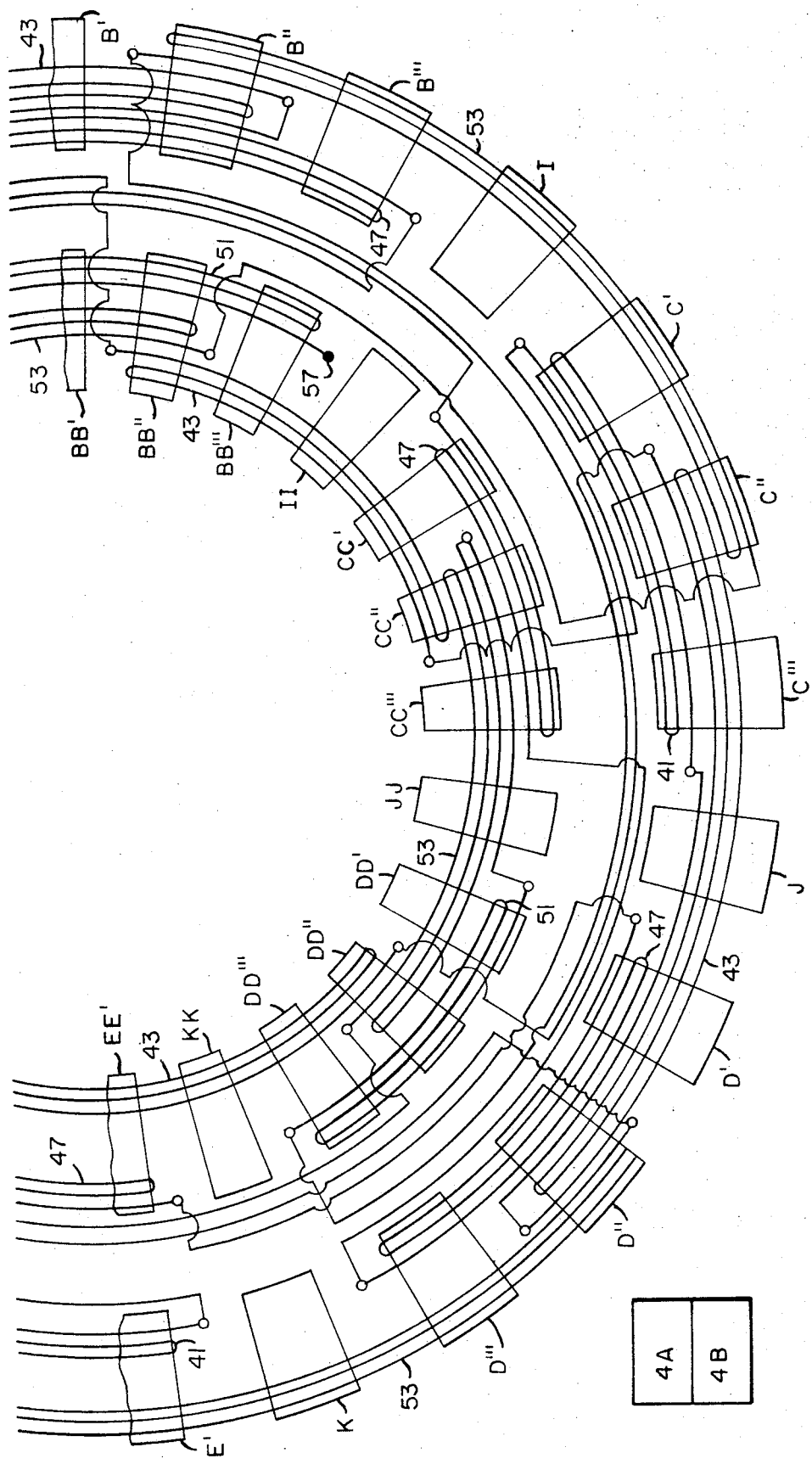

The embodiment diagrammatically illustrated by FIG. 3 and FIG. 4A–4B further illustrates the device 1 with an alternative connection of the main windings and encompassing windings to provide three generating circuits and three output signals. The various main coil windings and encompassing windings are wound about the various cores the same as in FIG. 2 but are interconnected with other windings differently. For the purpose of simplification of explanation, the structure of FIG. 3 carries the same reference designations except for the main winding coils and encompassing windings. Also, for purposes of clarification the cross members 13 and 14 of the laminations 11 are deleted in FIG. 3. FIGS. 4A and 4B in conjunction diagrammatically illustrate a perspective view from the ends of the device 1 with the windings interconnected in accord with FIG. 3. The structure of FIGS. 3 and 4A and 4B carries three main winding coils and two encompassing windings. A main coil 41 is wound with portions about the primary armature poles A, C and E all of which are on a common armature assembly of the armature structure. The coil 41 is tied in series with an encompassing winding 43. A first portion of the encompassing winding 43 encompasses the cores A'', A''', B', B'' and isolating pole H; a second portion encompasses the cores BB'', BB''', CC', CC'' and isolating pole II; a third portion encompasses cores C'', C''', D', D'' isolating pole J; a fourth portion encompasses cores DD'', DD''', EE', EE'' and isolating pole KK; a fifth portion encompasses cores E'', EE''', F', F'' and isolating pole L; and a sixth portion encompasses cores FF'', FF''', AA', AA'' and isolating pole HH. The main winding coil 41 and the encompassing winding 43 are tied in series across a pair of output terminals 45 and 46. A second main winding coil 47 is wound with portions about the primary armature poles B, D, F, AA, CC and EE. The main winding coil 47 is tied in series across a pair of output terminals 49 and 50. The portions of the winding coil 47 are arranged such that they include alternate armature poles on opposite armature assemblies with the included poles on one assembly angularly radially offset relative to the included poles on the opposite armature assembly. A third main winding coil 51 includes portions wound about the primary armature poles BB, DD and FF all of which are on a common side of the armature. The main winding coil 51 is joined in series with an encompassing winding 53. A first portion of the encompassing winding 53 encompasses the cores AA'', AA''', BB', BB'' and isolative pole HH; a second portion encompasses the cores B'', B''', C', C'' and isolative pole I; a third portion encompasses the cores CC'', CC''', DD', DD'' and isolating pole JJ; a fourth portion encompasses the cores D'', D''', E', E'' and isolating pole K; a fifth portion encompasses the cored EE'', EE''', FF', FF'' and isolating pole LL; and a sixth portion encompasses the cores F'', F''', A', A'' and isolating pole G. The main winding coil 51 and encompassing winding 53 are tied in series across a pair of terminals 55 and 57.

Figure 5:
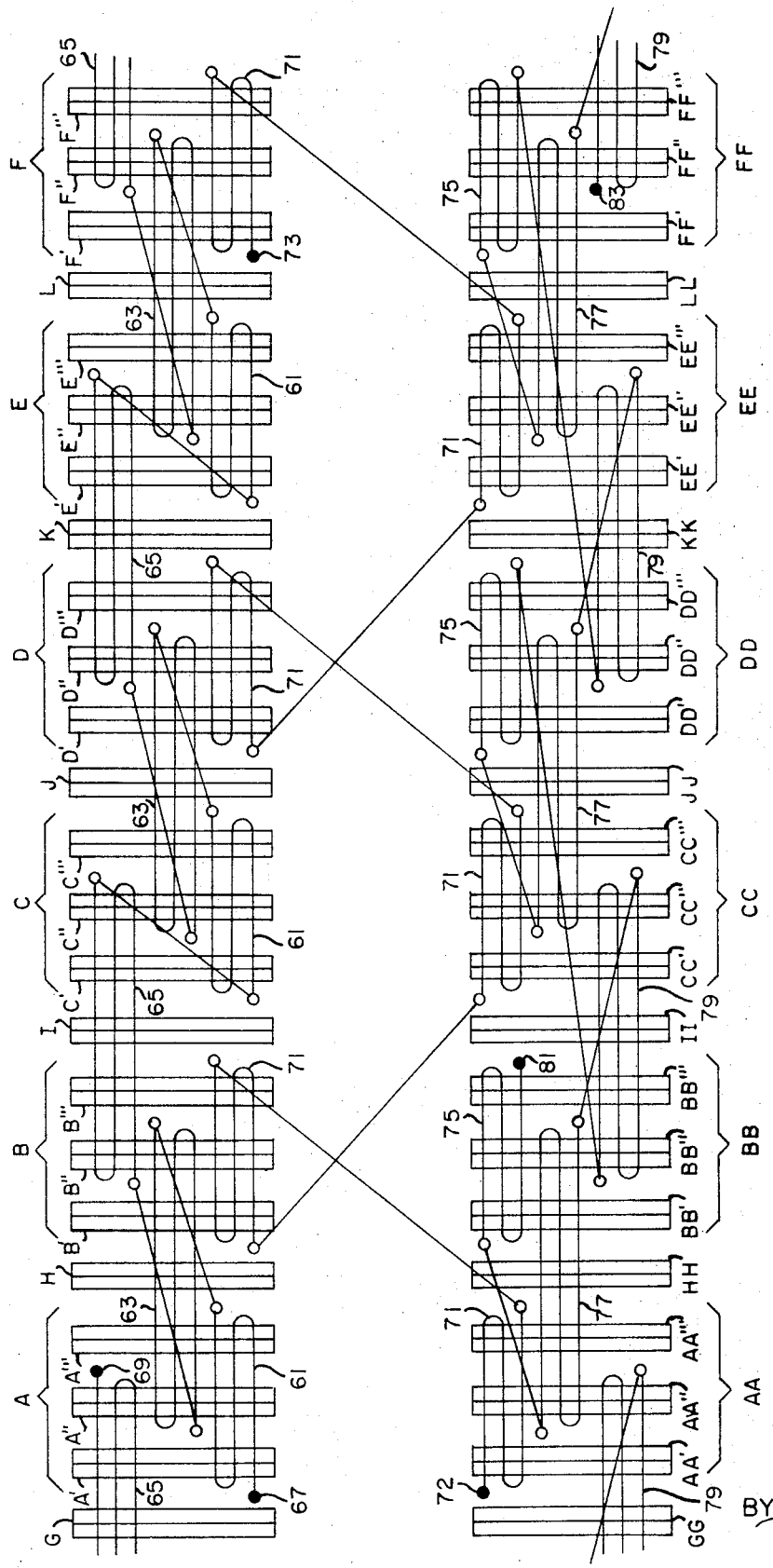
FIG. 5 is a diagrammatic illustration of the embodiment of FIG. 1 with the winding coils joined in an alternative relationship to provide three output signals.

Further embodiments of the present invention may include separate circuits in which at least one circuit is comprised of windings including coils on both armature assemblies such that individual coils are in cooperation with primary field poles of each magnetic denomination and additional circuits comprised of windings wound on cores on a common side of the armature such that all coils of the circuit are acted upon by field poles of the same magnetic denomination. For example, FIG. 5, diagrammatically illustrates such a connection. As in FIG. 3, the various main winding coils and encompassing windings are wound about the various cores similar to that of FIG. 2 but are interconnected with other windings differently. For purposes of simplication of explanation, the structure of FIG. 5 carries the same reference numerals except for the main winding coils and encompassing windings. The structure of FIG. 5 includes three main winding coils and two encompassing windings. A main winding coil 61 is wound with portions about primary armature poles A, C and E all of which are on a common side. The winding coil 61 is tied in series with an encompassing winding 63 and an encompassing collapse winding 65 across a pair of terminals 67 and 69. A first portion of the encompassing winding 63 encompasses the cores A'', A''', B', B'' and isolative pole H; a second portion of the winding 63 encompasses the cores C'', C''', D', D'' and isolative pole J; and a third portion of the winding 63 encompasses the cores E'', E''', F', F'' and isolating pole L. A first portion of the encompassing winding 65 encompasses the cores B'', B''', C', C'' and isolating pole I; a second portion of the winding 65 encompasses the cores D'', D''', E', E'' and the isolating pole K; and a third portion of the winding 65 encompasses the cores F'', F''', A', A'' and the isolating pole G. A second main winding 71 is wound with portions about each of the primary armature poles B, D, F, AA, CC and EE and across a pair of terminals 72 and 73. A third main winding 75 is would with portions about the primary armature poles BB, DD and FF all of which are on the same side. The winding 75 is tied in series with an encompassing winding 77 and an encompassing winding 79 all tied in series across a pair of terminals 81 and 83. A first portion of the encompassing winding 77 encompasses the cores AA'', A''', BB', BB'' and isolating pole HH; a second portion encompasses the cores CC'', CC''', DD', DD'' and isolating pole JJ; and a third portion encompasses the cores EE'', EE''', FF', FF'' and isolating pole LL. A first portion of the encompassing winding 79 encompasses the cores BB'', BB''', CC', CC'' and isolating pole II; a second portion encompasses the cores DD'', DD''', EE', EE'' and isolating pole KK; and a third portion encompasses the cores FF'', FF''', AA', AA'' and the isolating pole GG.

Alternators in accord with the teachings of the present invention may be constructed to accommodate various requirements. The structure may include a plurality of individual circuits. The number of field poles and armature poles may be varied, the placement of the winding portions of individual circuits relative to the position of winding portions of other circuits may be varied, the rotor may be rotated in either direction and the speed of rotation may be varied. These features provide for versatile use of operation on generating of electrical signals.

I claim:

1. An improved electromechanical energy conversion device comprising, in combination:

a magnetic field structure having at least one magnetically north denominated field pole and a corresponding magnetically south denominated field pole, said north and south poles being displaced axially relative to one another along a longitudinal axis, each north field pole being interconnected in common with an associated south field pole to establish a common magnetic path intermediate the interconnected north field pole and associated south field pole;

an armature structure having a first armature assembly adjacent the north field poles and a second armature assembly adjacent the south field poles, the armature assemblies being movable relative to the field structure along relative paths of travel adjacent to each of said north field poles and each of said south field poles, the armature structure including a plurality of individual magnetic circuits interconnecting said first and second armature assemblies and terminating at opposite terminal ends adjacent to the relative paths of travel of the field structure to establish armature cores adjacent to the relative paths of travel of said north and south field poles, each of said magnetic circuits forming at least in part a primary armature pole at said first armature assembly and at least in part a primary armature pole at said second armature assembly, the armature cores at opposite terminal ends of common magnetic circuits of at least some of the magnetic circuits being laterally off-set relative to one another about said paths of travel, and each armature pole adjacent one of said relative paths of travel is at least in part connected in common to the magnetic circuits of a plurality of armature poles adjacent the other relative path of travel; and first coil means encompassing armature cores of the first armature assembly to establish armature poles of the first armature assembly, said first coil means including a first plurality of main energizing winding coil portions electrically joined in a first common circuit with each of said first plurality of main energizing winding coil portions wound about alternate armature poles of said first armature assembly; second coil means encompassing armature cores of the second armature assembly to establish armature poles of the second armature assembly, said second coil means including a second plurality of main energizing winding coil portions electrically joined in a second common circuit with each of said second plurality of main energizing winding coil portions would about alternate armature poles of said second armature assembly; and a third coil means having a third plurality of main energizing winding coil portions electrically joined in a third common circuit, each of said third energizing winding coil portions wound about alternate armature poles of at least one of the armature assemblies.

2. The device of claim 1 further including a first encompassing winding coil with coil portions wound about primary armature poles with each portion of said first encompassing winding coil portion encompassing at least part of adjacent primary armature poles of at least one of said armature assemblies.

3. The device of claim 2 including a second encompassing winding coil with coil portions wound about primary armature poles with each encompassing winding coil portion of said second encompassing winding coil encompassing at least part of adjacent primary armature poles of the other of said armature assemblies.

4. The device of claim 2 in which said encompassing winding coil portions of said first encompassing winding coil are electrically joined in common to said first common circuit.

5. The device of claim 4 further including a plurality of isolating poles with one of each of said isolating poles positioned intermediate each of two adjacent primary armature poles of each of said first and second armature assemblies.

6. The device of claim 5 in which the magnetic circuit means establishes a plurality of individual cores about each armature assembly with each core terminating adjacent one of said relative paths of travel, and a magnetic insulator material intermediate adjacent cores.

7. The device of claim 6 in which each primary armature pole includes a plurality of individual cores encompassed by one portion of one of said energizing coils.

8. The device of claim 7 in which each of said primary armature poles includes a shade pole.

9. The device of claim 6 in which each isolating pole about one armature assembly is at least in part magnetically common to at least one of said primary armature poles about the other armature assembly.

10. The device of claim 9 in which each core of each primary armature pole is encompassed by at least one portion of one of said energizing winding coil portions.

11. The device of claim 10 in which each primary armature pole is encompassed in part by at least one portion of each of two encompassing winding coil portions of different electrical circuits.

12. An alternator comprising, in combination:
a magnetic field structure having a first field pole assembly of north polarity denomination and a second field pole assembly of south polarity denomination, said second field pole assembly being axially displaced from said first field pole assembly along an axis of rotation, the field poles of one polarity denomination being displaced radially relative to the field poles of the other denomination;
an armature structure having a first armature assembly adjacent the north denominated field assembly and a second armature assembly adjacent the south denominated field assembly, said first and second armature assemblies axially displaced from each other along said axis of rotation;
the field structure and the armature structure being rotatable relative to one another about said axis of rotation and establishing orbits of relative rotation intermediate each of the field assemblies and each of the armature assemblies; each of the armature assemblies including a plurality of radially spaced cores of magnetizable material along the associated orbits of relative rotation, each core of the first armature assembly being joined in a common magnetic circuit with at least one of the cores of the second armature assembly; and
at least two generating circuits each having a plurality of main winding coil portions electrically joined in common, each of said main winding coil portions of each generating circuit being wound about a plurality of individual of said cores to form a primary armature pole of a width substantially equal to the width of the field poles and with a shade pole positioned intermediate two of the individual cores of each of said primary armature poles, the main winding portions of the same generating circuit being radially spaced from each other along the orbits of relative rotation and with adjacent main winding coil portions about the orbit paths being joined to a different one of said generating circuits; at least one of said generating circuits including main winding coil portions wound about separate cores of the first and of the second armature assemblies with each main winding coil portion radially offset about the axis of rotation relative to other main winding coil portions and in which cores associated with each of said primary armature poles of one of the armature assemblies is at least in part magnetically interconnected with primary armature poles of the other of the armature assemblies; and at least one of the generating circuits including an encompassing winding coil having a plurality of encompassing coil portions with each encompassing winding coil portion wound about a plurality of cores including cores of adjacent primary armature poles.

13. The alternator of claim 12 in which each field assembly includes a plurality of angularly equi-spaced pole faces.

14. The alternator of claim 13 in which the pole pieces of the opposite field pole assembly are angularly displaced relative to each other along the orbits of relative rotation.

15. The alternator of claim 14 in which the main winding coil portions of each main winding of each armature assembly are symmetrically displaced about the associated asrmature assembly.

16. The alternator of claim 15 in which the encompassing winding coil portions of each encompassing winding of each armature assembly are symmetrically displaced along the associated armature assembly.

17. The alternator of claim 16 in which each primary armature pole supports portions of at least two separate encompassing winding coils.

* * * * *

UNITED STATES PATENT OFFICE
CERTIFICATE OF CORRECTION

Patent No. 3,728,564                    Dated April 17, 1973

Inventor(s) John DeRugeris

It is certified that error appears in the above-identified patent and that said Letters Patent are hereby corrected as shown below:

Column 1, line 19, change "magnetic" to --magnet--;

Column 7, line 26, change " $\Phi, AA''$ " to --,AA''--;

Column 11, line 40, change "would" to --wound--; and

Column 12, line 54, change "would" to --wound--.

Signed and sealed this 1st day of January 1974.

(SEAL)
Attest:

EDWARD M. FLETCHER, JR.                RENE D. TEGTMEYER
Attesting Officer                      Acting Commissioner of Patents